(12) United States Patent
Russell (10) Patent No.: US 6,701,985 B2
(45) Date of Patent: Mar. 9, 2004

(54) ENERGY RETURN WHEEL SYSTEMS AND METHODS

(76) Inventor: Brian A. Russell, 6171 Rain Dance Trail, Littleton, CO (US) 80125-9268

( * ) Notice: Subject to any disclaimer, the term of this patent is extended or adjusted under 35 U.S.C. 154(b) by 0 days.

(21) Appl. No.: 10/151,712

(22) Filed: May 20, 2002

(65) Prior Publication Data

US 2003/0213538 A1 Nov. 20, 2003

(51) Int. Cl.[7] .................................................. B60C 7/10
(52) U.S. Cl. ............................. 152/47; 152/48; 152/50; 152/30
(58) Field of Search .................... 152/1, 6, 8, 9, 152/30, 40, 41, 42, 47, 48, 49, 50, 53, 56, 57, 58, 160, 254, 256, 258, 259, 271, 273

(56) References Cited

U.S. PATENT DOCUMENTS

| 1,012,331 A | 12/1911 | Cunningham |
| 1,024,091 A | 4/1912 | Martin et al. |
| 1,054,444 A | 2/1913 | Olivier |
| 1,123,529 A | 1/1915 | Harlan |
| 1,449,920 A | 3/1923 | Stanley |
| 1,646,480 A | 10/1927 | Harpstrite |
| 1,650,271 A | 11/1927 | Harpstrite |

FOREIGN PATENT DOCUMENTS

GB          12249          5/1906

*Primary Examiner*—Russell D. Stormer
(74) *Attorney, Agent, or Firm*—Townsend and Townsend and Crew, LLP (57) ABSTRACT

The present invention provides exemplary vehicle wheel assemblies for use with a wide range of wheeled vehicles and apparatus. In one embodiment, a wheel assembly (100) includes first and second rim portions (210, 212) having edges (220, 222). The wheel assembly includes a cartridge disposed in a trough portion between the rim edges. The cartridge includes a chamber portion (300) having a plurality of spaced protrusions (310), a resilient member (400) disposed over the plurality of spaced protrusions, an actuator (500) disposed over the resilient layer, and a traction layer (600) disposed over the actuator. The actuator is adapted to compress the resilient layer at least partially into the chamber portion when the wheel assembly is loaded with a weight. In this manner, the wheel assembly is capable of providing energy return to the wheel assembly during rotation thereof.

33 Claims, 9 Drawing Sheets

SECTION A-A

ENERGY RETURN WHEEL SYSTEMS AND METHODS

BACKGROUND OF THE INVENTION

The present invention relates generally to wheeled systems, and in particular, to wheeled systems having exemplary energy return features and methods of using and making same.

Since the days of ancient man, wheels have been used for a variety of purposes and with a variety of vehicles. Wheels have made possible carts, carriages, wagons, motorized and non-motorized vehicles, and the like, for the transportation of people and freight. The design of wheel assemblies for such items has focused on producing tires and wheels capable of accomplishing their intended use. Initially, this involved making wheel assemblies that were durable enough to travel over rough surfaces.

The invention of the automobile in the early 1900s, and the use of rubber and rubber compounds, increased the number and variety of wheeled systems. The introduction of air-inflated rubber tires resulted in a host of new design problems. A great amount of effort has been spent to make tires and wheel assemblies that have the desired resiliency and stability, maintain their integrity while inflated, are resistant to impacts and punctures, and the like. Great attention also has been given to developing various tread patterns to provide improved traction on paved or smooth surfaces.

One feature of tires and wheel assemblies which has not received particular emphasis involves the assemblies' energy return characteristics. For example, while current automobile tires generally provide sufficient traction, their development has not focused on how the tires interact with the road surface to transfer energy in an idealized fashion. Hence, notwithstanding the extensive use of wheeled systems, room for drastic improvement still exists in the field of energy return.

BRIEF SUMMARY OF THE INVENTION

The present invention provides exemplary vehicle wheel assemblies for use with a wide range of wheeled vehicles and apparatus. In one embodiment, the wheel assembly includes a first rim portion having a first circumferential edge and a second rim portion having a second circumferential edge. The first and second rim portions are coupled together to define a trough portion between the two edges. The wheel assembly includes a cartridge disposed in the trough portion between the first and second circumferential edges. The cartridge includes a chamber portion having a plurality of spaced protrusions, a resilient member disposed over the plurality of spaced protrusions, an actuator disposed over the resilient layer, and a traction layer disposed over the actuator. The actuator is adapted to compress the resilient layer at least partially into the chamber portion when the wheel assembly is loaded with a weight. In this manner, the wheel assembly is capable of providing energy return to the wheel assembly during rotation thereof.

In one aspect, the spaced protrusions are positioned to define at least two circumferential rings of protrusions. In another aspect, the chamber portion includes a generally trough-shaped chamber portion having first and second lips, with the resilient member in cooperation with and/or coupled to the first and second lips.

In a particular aspect, the resilient member has upper and lower surfaces, with the lower surface including a plurality of raised ridges. The raised ridges are positioned to be in cooperation with the plurality of spaced protrusions. The resilient member upper surface also may include a second plurality of raised ridges in cooperation with the actuator. The raised ridges increase the resilient member thickness at desired locations. In one aspect, the resilient member is about twice as thick at a location having one of the raised ridges compared to at a location devoid of the plurality of raised ridges.

In one aspect, the resilient member is in cooperation with and/or coupled to an outer rim of the chamber portion to define a generally hermetically-sealed chamber. In alternative aspects, the hermetically-sealed chamber has an internal pressure that is less than one (1) atmosphere (ATM), or is a vacuum chamber.

In one aspect of the present invention, the actuator comprises a cylindrical-shaped band, the band having a plurality of spaced apart holes formed therethrough. The spaced apart holes also may be positioned to define at least two circumferential rings of spaced apart holes. Preferably, the spaced apart holes are positioned to be in cooperation with the plurality of spaced apart protrusions in the chamber portion. For example, in one aspect the spaced apart protrusions in the chamber portion are adapted to extend at least part way into the spaced apart holes of the actuator when the wheel assembly is loaded with the weight.

In one aspect of the present invention, the traction layer comprises a cylindrical-shaped traction band, with the traction band having a plurality of spaced apart holes formed therethrough. Again, the spaced apart holes may be positioned to define at least two circumferential rings of spaced apart holes in the traction band, and also may be positioned to be in cooperation with the plurality of spaced apart protrusions in the chamber portion. Further, the spaced apart protrusions in the chamber portion may extend at least part way into the spaced apart holes of the traction band when the wheel assembly is loaded with the weight.

In one aspect, the resilient member is adapted to stretch at least part way into the spaced apart actuator band holes when the wheel assembly is loaded with the weight. The weight may include a motorized vehicle, a non-motorized vehicle, a person or persons, freight, and the like.

In alternative aspects, the traction layer comprises a substantially incompressible rubber, the resilient member comprises a rubber, and the chamber portion and the actuator comprise a nylon. The traction layer may, but need not, have a groove pattern defined on an outer surface thereof.

In another embodiment, a wheel assembly of the present invention includes a cartridge adapted to be coupled to a wheel rim between first and second outer rim edges. The cartridge includes a chamber portion having a plurality of spaced protrusions, a resilient member disposed over the plurality of spaced protrusions, an actuator disposed over the resilient layer, and a traction layer disposed over the actuator. The actuator is adapted to compress the resilient layer at least partially into the chamber portion when the wheel assembly is loaded with a weight. In one aspect, the cartridge is generally cylindrical and is disposed between the two rim edges.

In another embodiment of the present invention, a wheel assembly includes a traction layer disposed over an actuator, with the traction layer and actuator each having a plurality of holes disposed therethrough, and with the traction layer holes in alignment with the actuator holes. The assembly further includes a chamber portion adapted to be coupled to a wheel rim, the chamber portion having inner and outer edges defining a recessed bottom therebetween having a plurality of spaced protrusions. A resilient member is disposed between the chamber portion and the actuator. The resilient member is adapted to stretch into the chamber portion between the spaced protrusions, and is adapted to stretch at least part way into the actuator holes over the spaced protrusions.

In a particular aspect, the traction layer, actuator, chamber portion and resilient member are each generally cylindrical in shape, with the actuator and chamber portion having a greater hoop strength than the traction layer and the resilient member.

Other features and advantages of the invention will appear from the following description in which the preferred embodiments have been set forth in detail in conjunction with the accompanying drawings.

DETAILED DESCRIPTION OF THE INVENTION

Figure 1A:
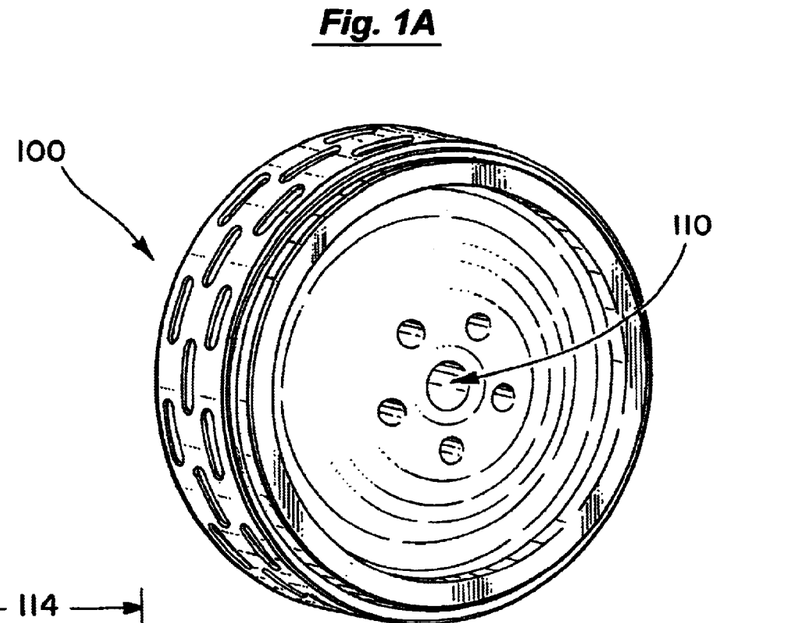
FIGS. 1A and 1B depict an overall view and a front view, respectively, of a wheel assembly according to one embodiment of the present invention.
Figure 1B:
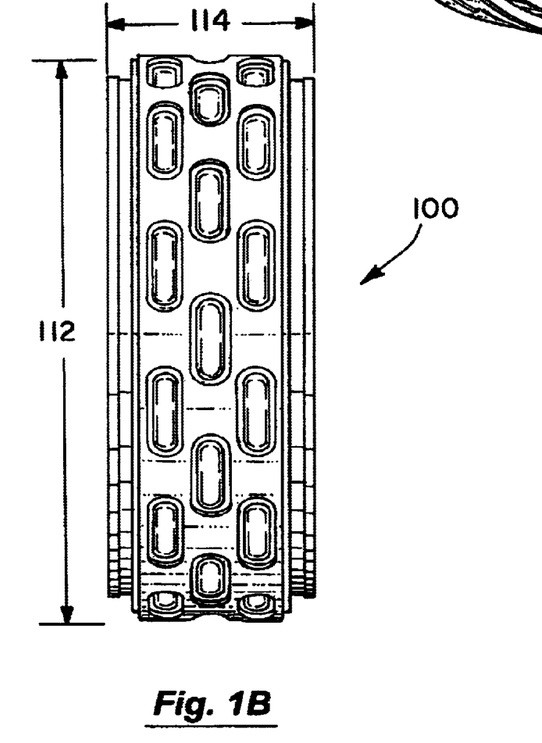
Figure 2A:
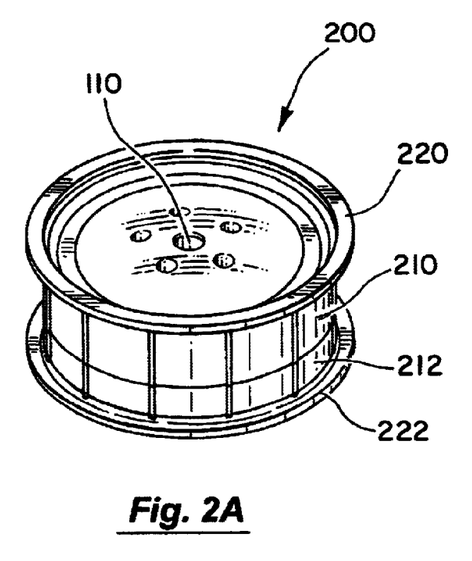
FIGS. 2A and 2B are an overall view and a front view, respectively, of a rim for use in wheel assemblies of the present invention.
Figure 2B:
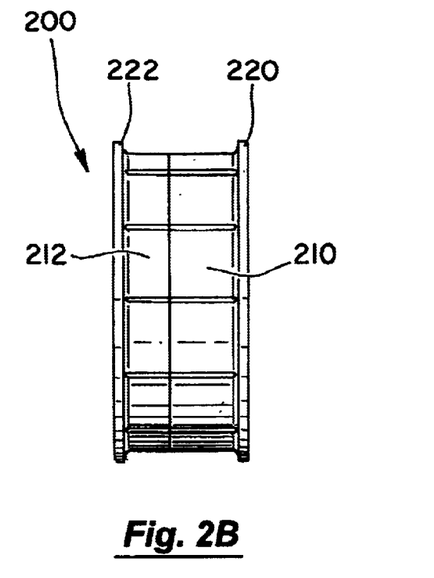
Figure 2C:
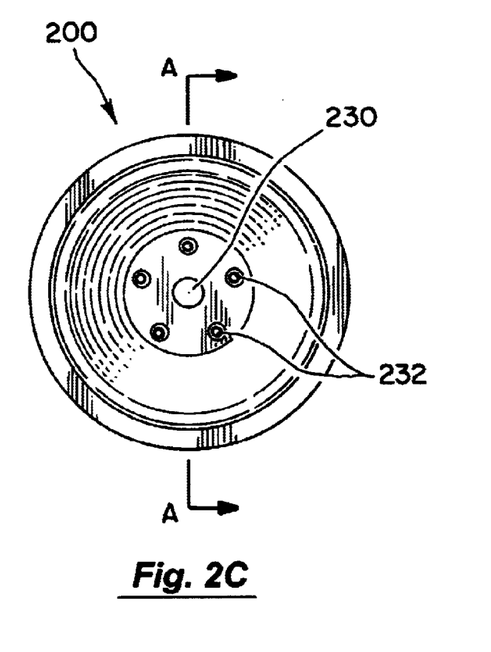
FIGS. 2C and 2D are a side view and a cross-sectional view taken along A—A, respectively, of the rim shown in FIG. 2A.
Figure 2D:
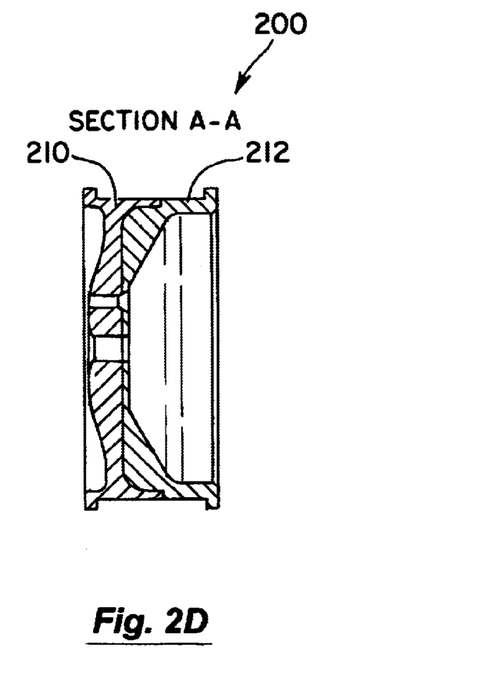

FIGS. 1A and 1B depict a wheel assembly 100 according to one embodiment of the present invention. Wheel assemblies 100 will find use with a wide range of wheeled vehicles, both motorized and non-motorized. For example, wheel assemblies 100 may be used with automobiles, trucks, sports utility vehicles (SUVs), minivans and the like. Wheel assemblies 100 will find use with two-wheeled vehicles such as motorcycles, motorscooters, non-motorized scooters, and bicycles. Further, wheel assemblies 100 of the present invention may be used with a wide range of other wheeled items, including unicycles, tricycles, carts, strollers, tractors, wheel-barrows and the like.

Wheel assemblies 100 of the present invention have exemplary characteristics for the transfer of energy from one state to another. In a particular aspect, wheel assemblies 100 are adept at transferring potential energy into kinetic energy in an efficient manner. Wheel assemblies 100 help focus the transfer of energy in line with the direction of travel of the wheel. In this manner, energy otherwise wasted, such as with the flexing and unflexing of tire sidewalls, can be minimized or avoided.

As seen in FIGS. 1A and 1B, wheel assembly 100 has a central opening 110 for mounting the wheel to an axle, hub, or the like. In one embodiment, wheel assembly 100 has a diameter 112 ranging from about twenty (20) inches to about thirty (30) inches, and a width 114 ranging from about six (6) inches to about twelve (12) inches. In a particular embodiment, diameter 112 is about twenty-eight (28) inches and width 114 is about twelve (12) inches. It will be appreciated, however, by those skilled in the art that additional wheel assembly dimensions are within the scope of the present invention, depending in part on the intended use of wheel assembly 100. Wheel assemblies 100 comprise one or more components, at least some of which are described and shown in subsequent Figures.

Turning to FIGS. 2A–6B, various components of one embodiment of wheel assembly 100 according to the present invention will be described. FIGS. 2A–2D depict a rim 200 for use with wheel assembly 100. Rim 200 has a first rim portion 210 and a second rim portion 212. Rim portion 210 has a lip or circumferential edge 220. Similarly, rim portion 212 has a lip or circumferential edge 222. As shown in FIG. 2B, the two rim portions 210 and 212 are coupled together so that edges 220, 222 define outer edges of rim 200. As can be seen in FIG. 2B and 2D, such a configuration provides a generally trough-shaped rim 200 when viewed in cross section, or from the front or rear. Rim portions 210 and 212 may be coupled together in a variety of ways known to those skilled in the art, including by bolt, weld and the like. Further, rim 200 has a central opening 230, and a number of spaced holes 232 so that rim 200 may be coupled to a vehicle (not shown) by way of bolts, lug nuts, and the like.

Figures 3A, 3B, 3C:
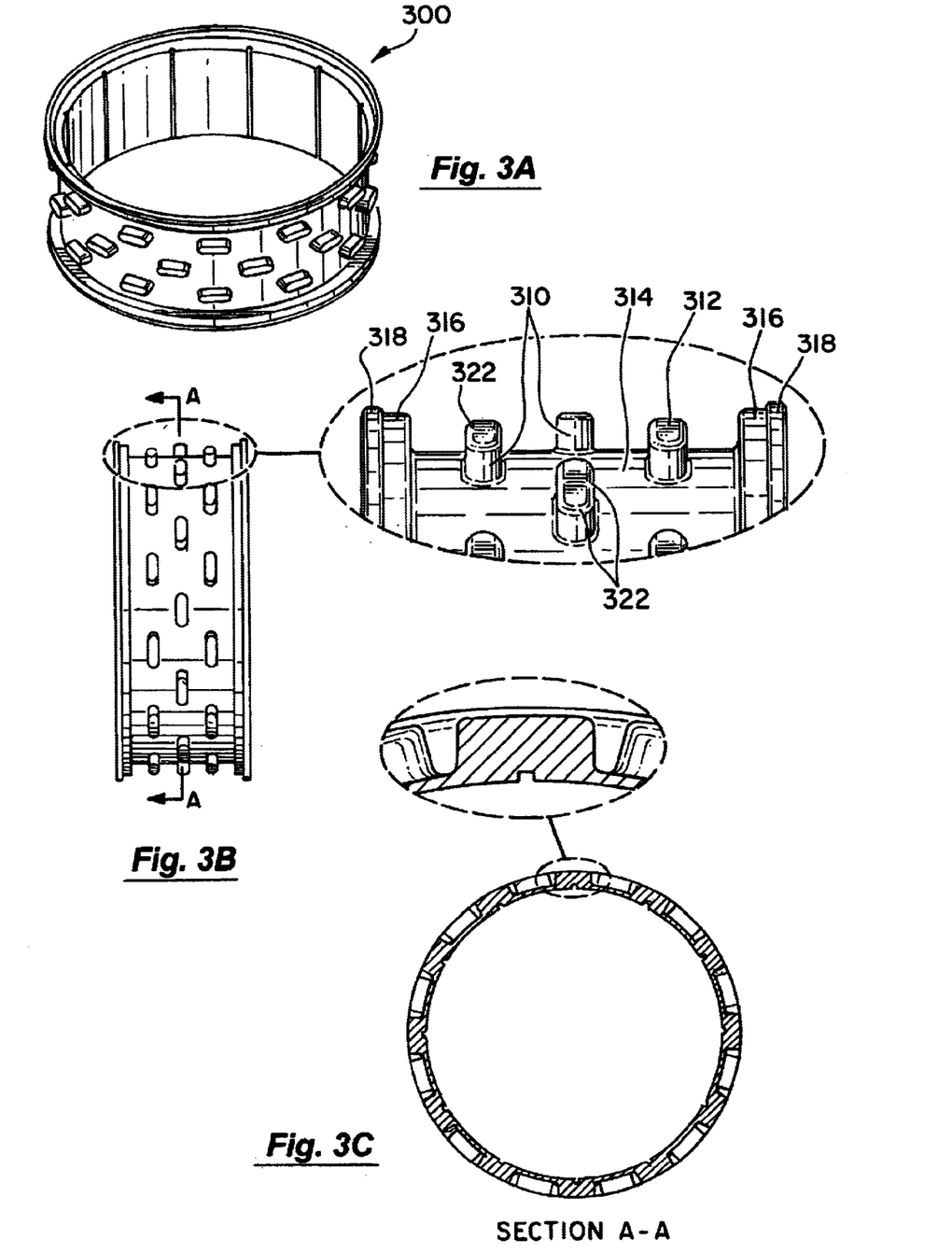
FIG. 3A is an overall view of a chamber portion of a wheel assembly according to an embodiment of the present invention.
FIGS. 3B and 3C are a front view and a side cross-sectional view, respectively, of the chamber portion shown in FIG. 3A.

In one embodiment, vehicle wheel assembly 100 includes a chamber portion 300 as shown in FIGS. 3A–3D. Chamber portion 300 comprises a generally cylindrical member having a generally trough-shaped upper or lower portion when viewed from the front or rear (FIG. 3B). More specifically, chamber portion 300 has a bottom surface 314 disposed between two outer lip or edge portions. In a particular embodiment, chamber portion 300 has an inner lip 316 and an outer lip 318 bordering one or both sides of bottom surface 314. In an alternative embodiment, only a single lip is disposed on each side of bottom surface 314. Preferably, the overall shape of chamber portion 300 generally coincides with the shape of rim 200. In this manner, chamber portion 300 may be disposed around rim 200, and maintained between rim edges 220 and 222. In particular embodiments, chamber portion comprises a nylon, one or more metal alloys, a composite, or the like. In one embodiment, bottom surface 314 is about 0.25 inches thick.

Chamber portion 300 includes a plurality of spaced-apart protrusions or posts 310 as can be seen in FIGS. 3A and 3B. The number of protrusions 310 will depend in part upon their desired spacing, the width and diameter of chamber portion 300, as well as the size of protrusions 310. In some embodiments, protrusions 310 are positioned to define one or more circumferential rings of protrusions 310. In the particular embodiment shown in FIG. 3B, protrusions 310 are positioned to define three circumferential rings of spaced protrusions 310. Protrusions 310 in the inner and outer rings have a similar or identical pattern. The middle ring of protrusions 310 has a similar spacing between protrusions 310 within the ring, but the ring is rotationally offset from the two outer rings by approximately one-half the distance between two adjacent protrusions 310 (FIG. 3B). Other arrangements of protrusions 310 also fall within the scope of the present invention. For example, protrusions 310 may be arranged in two (2) circumferential rings, or four (4) or more circumferential rings depending, in part, on width 114 of wheel assembly 100.

The overall shape of protrusions 310 also may vary within the scope of the present invention. In a particular embodiment, protrusions 310 have a generally oval, elongated oval or elliptical shape. Each protrusion 310 also has an upper surface 312 that is generally oval, elongated oval or elliptical in shape. Protrusions 310 preferably have rounded or smooth upper edges 322 adjoining surface 312.

Figure 4A:
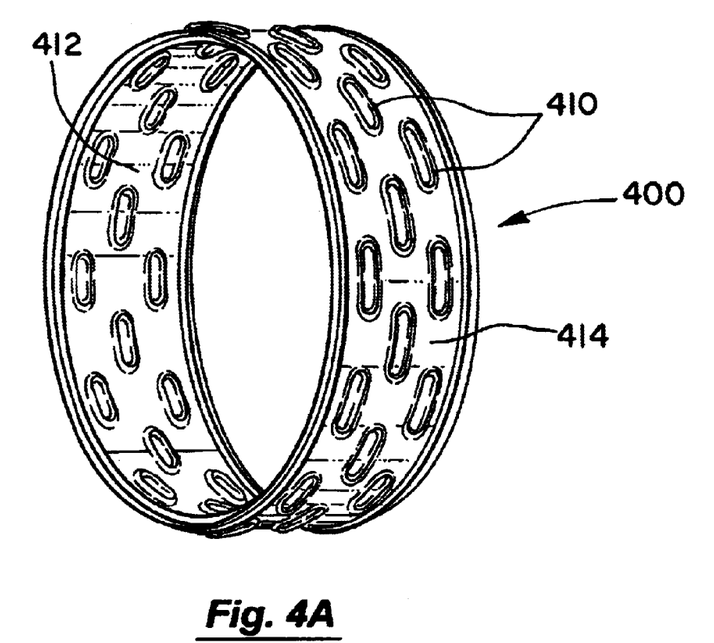
FIGS. 4A and 4B are an overall view and a front view, respectively, of a resilient member for use in a wheel assembly according to the present invention.
Figure 4B:
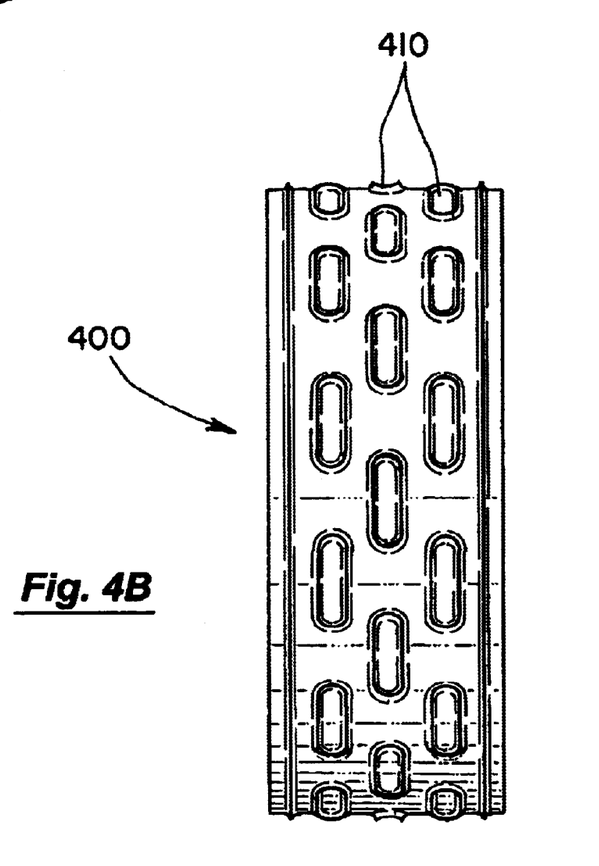

Wheel assembly 100 includes a resilient member 400 disposed over chamber portion 300. As can be seen in FIGS. 4A and 4B, resilient member 400 is a generally cylindrical-shaped resilient member 400 having an inner surface 412 and an outer surface 414. In one embodiment, inner surface 412 has a plurality of raised ridges 410 extending therefrom. Similarly, in one embodiment outer surface 414 has a plurality of raised ridges 410 extending therefrom. As can be seen in FIGS. 4A and 4B, in a particular embodiment, raised ridges 410 are shaped and positioned in a similar fashion as protrusions 310 of chamber portion 300. In this manner, in one embodiment, raised ridges 410 are in cooperation with the protrusions 310 of the underlying chamber portion. In a particular embodiment, ridges 410 on inner surface 412 are oval, elongated oval or elliptical in shape.

In one embodiment, the outer edges of resilient member 400 are adapted to be coupled to lips 316 and/or lips 318 of chamber portion 300. Resilient member 400 may be coupled to chamber portion 300 using lamination, a chemical bond, stitching, and the like. In an alternative embodiment, resilient member 400 is maintained in cooperation with chamber portion 300. In one such embodiment, resilient member 400 is held in place relative to chamber portion 300, at least in part, by overlying structure described below.

In one embodiment, the thickness of resilient member 400 varies across its width. For example, the thickness of the edges of resilient member 400 are between about 0.125 inches and 0.25 inches. The portion of resilient member 400 spaced apart from bottom surface 314 is about 0.25 inches. The portion of resilient member 400 where ridges 410 exist may be between about 0.25 inches and about 0.50 inches thick. In this manner, resilient member 400 thickness varies, with the thicker portions generally abutting adjacent structure such as chamber portion 300. It will be appreciated by those skilled in the art that the above dimensions are for a particular embodiment, and other thicknesses fall within the scope of the present invention.

In a particular embodiment, resilient member 400 comprises a rubber. Resilient member 400 may comprise a natural rubber, a synthetic rubber, or some combination thereof. In this manner, resilient member 400 has exemplary elastic characteristics. The stretching of resilient member 400, as further described below, results in the storage of energy as potential energy in the stretched resilient member 400, similar to a stretched rubber band. Upon its release, resilient member 400 returns an extremely large percentage approaching one hundred percent (100%) of the stored energy in the form of kinetic energy. The present invention directs that energy in a desired fashion to facilitate a rolling motion of wheel assembly 100.

Figure 5A:
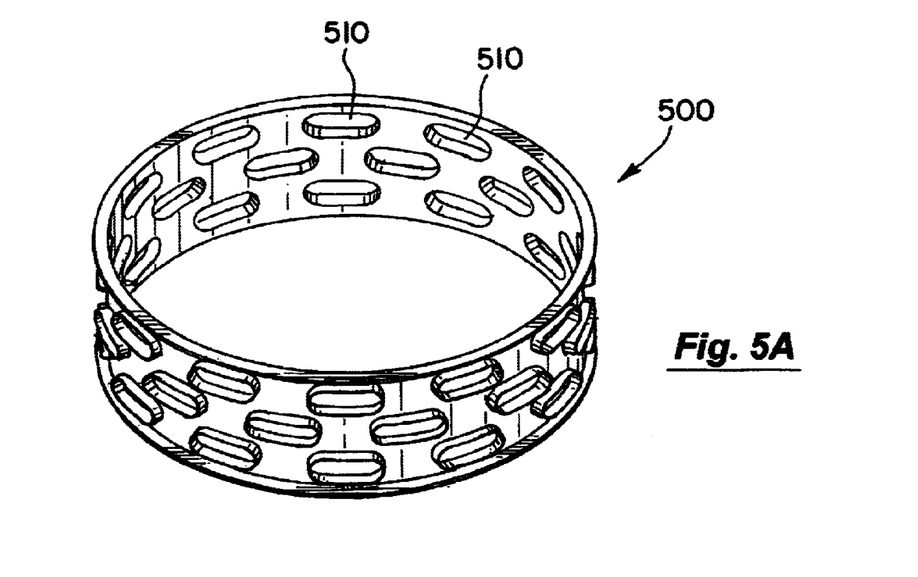
FIGS. 5A and 5B are an overall view and a front view, respectively, of an actuator for use with wheel assemblies according to embodiments of the present invention.
Figure 5B:
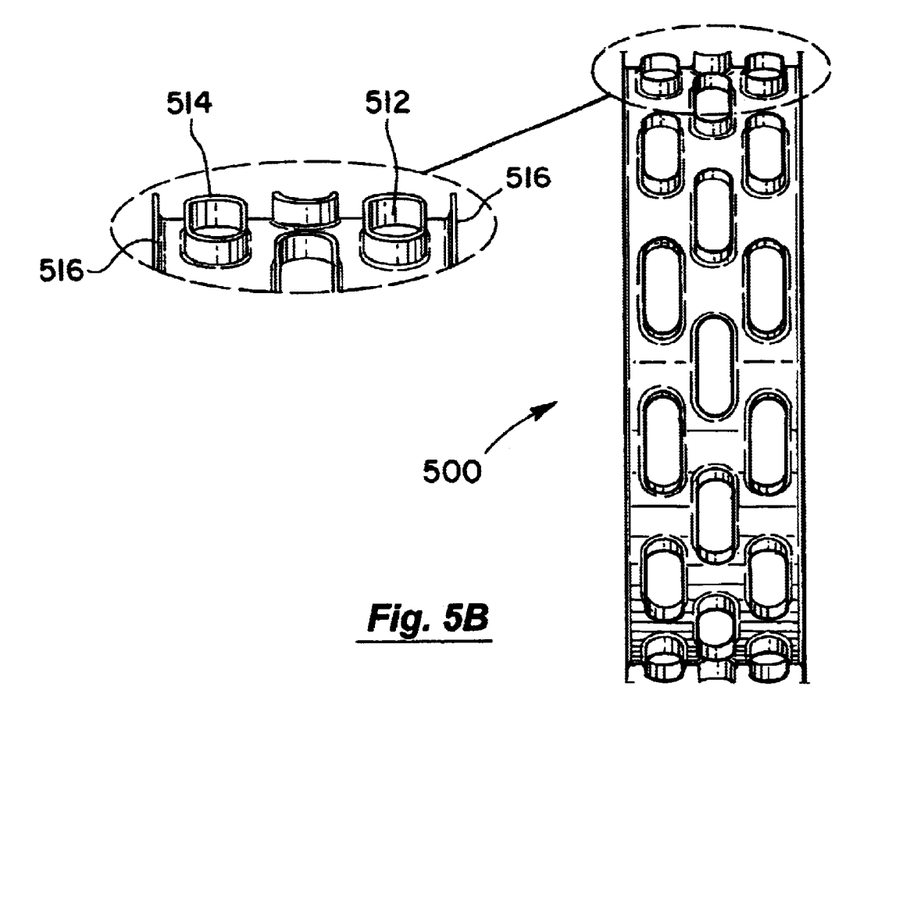

Turning now to FIGS. 5A–5B, an actuator component 500 according to the present invention will be described. Actuator 500 preferably is disposed over resilient member 400. As can be seen in FIG. 5A, actuator 500 has a plurality of spaced-apart holes 510. Again, in one embodiment, holes 510 are spaced apart to define circumferential rings of holes 510 about the generally cylindrical actuator 500. Holes may be defined in two (2), three (3) or more rings in some embodiments. Preferably, actuator 500 is positioned relative to resilient member 400 and chamber portion 300 so that holes 510 are disposed over or in cooperation with protrusions 310. Holes 510 may be in cooperation with ridges 410 on resilient member 400 outer surface 414.

Actuator 500, in one embodiment, has exterior edges or lips 516 disposed around one or both sides of the generally cylindrical actuator 500. Further, the outer surface of actuator 500 has a plurality of raised protrusions 512 each having an upper surface 514. Holes 510 are formed at the bottom of protrusions 512. In particular embodiments, actuator 500 comprises nylon, one or more metal alloys, a composite, or the like. Preferably, actuator 500 has a greater hoop strength than resilient member 400. Actuator 500 may comprise the same or substantially the same material as chamber portion 300, and hence may have the same or substantially the same hoop strength. In one embodiment, actuator 500 has a thickness that is from about 0.25 inches to about 0.50 inches.

Figures 6A, 6B:
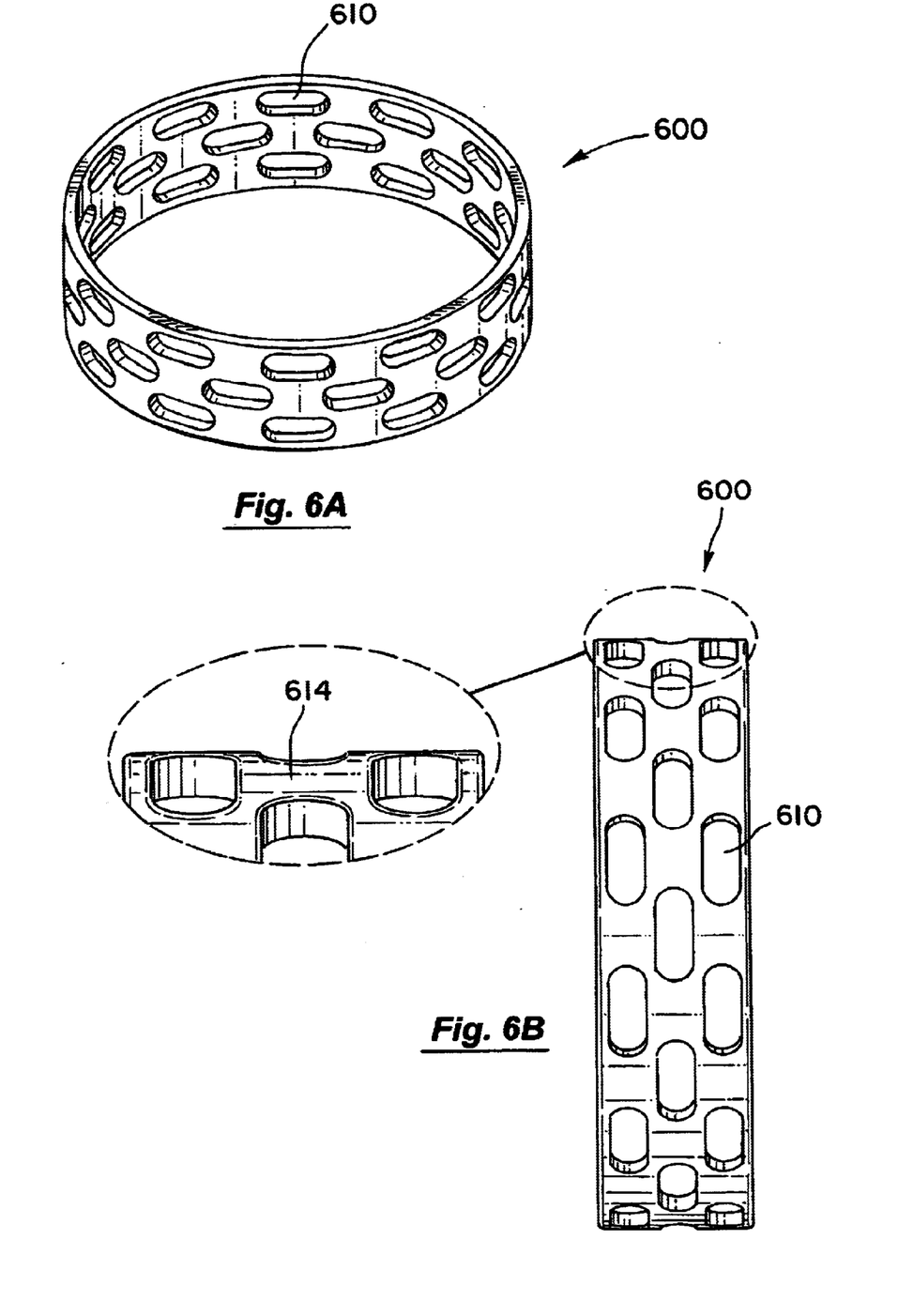
FIGS. 6A and 6B are an overall view and a front view, respectively, of a traction layer for use in a wheel assembly according to an embodiment of the present invention.

A traction layer 600, as shown in FIGS. 6A and 6B, is disposed over actuator 500. A plurality of spaced apart holes 610 are formed through traction layer 600. In a particular embodiment, holes 610 are in cooperation with holes 510 of actuator 500, and hence are spaced in a similar or identical pattern. While holes 510 and 610 are shown to be oval, elongated oval, elliptical or a similar shape, the shapes of holes 510 and 610 may vary within the scope of the present invention. In a particular embodiment, protrusions 310, holes 510 and holes 610 all have the same general shape. In another embodiment, protrusions 310, holes 510 and hole 610 have similar spacing and arrangement. In a particular embodiment, traction layer 600 comprises a hard and substantially incompressible rubber compound.

In one embodiment, traction layer 600 has a generally smooth outer surface 614 between holes 610. In other embodiments, surface 614 is a grooved surface. For example, in a particular embodiment, outer surface 614 has a plurality of grooves formed therein similar to grooves found in bicycle or automobile tires. Such grooves (not shown) would facilitate traction in inclement weather or on rough surfaces.

Figure 7A:
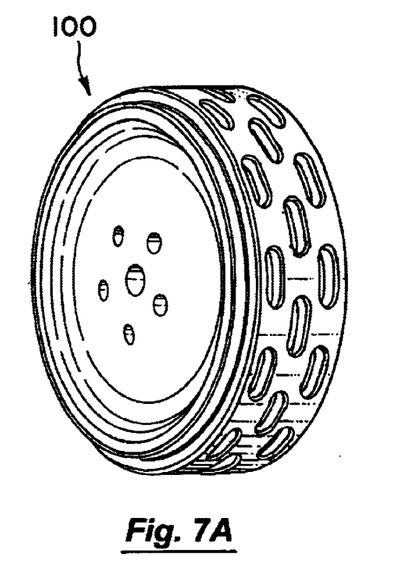
FIG. 7A is an overall view of a wheel assembly according to an embodiment of the present invention.
Figure 7B:
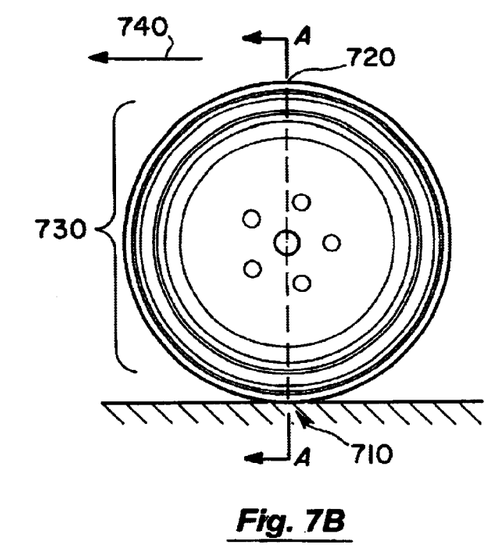
FIGS. 7B and 7C are a side view and a front cross-sectional view, respectively, of the wheel assembly shown in FIG. 7A.
Figure 7C:
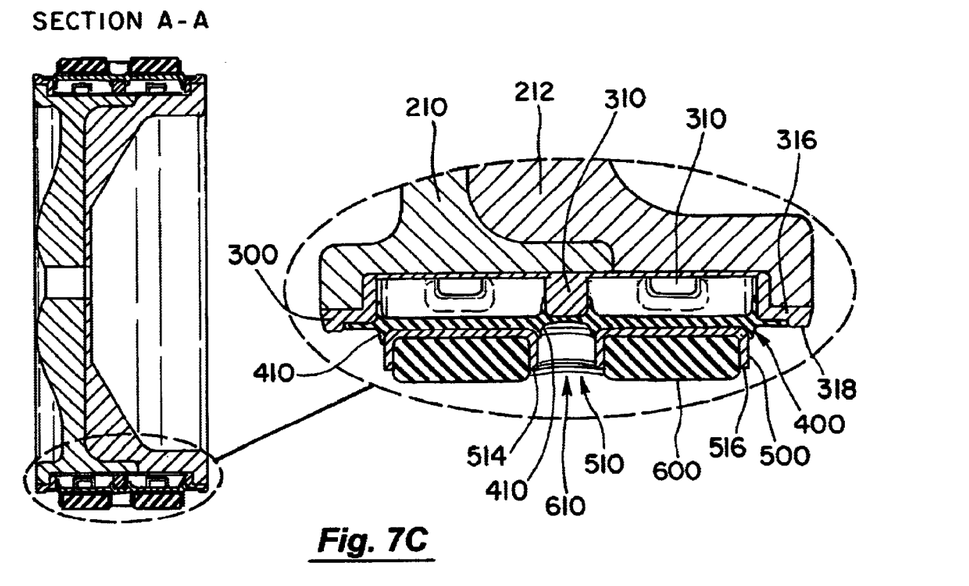

Turning now to FIGS. 7A–7C, one embodiment of wheel assembly 100 will be described. In a particular embodiment, chamber portion 300, resilient member 400, actuator 500 and traction layer 600 are arranged together to define a cartridge. This cartridge is coupled to rim 200. This may occur, for example, by placing the cartridge onto one of rim portions 210, 212 and subsequently coupling the two rim portions 210, 212 together. In this manner, apparatus of the present invention may be used and incorporated with rims having similar construction to that currently used for automobiles or other existing vehicles.

As best seen in FIG. 7C, which is a cross-sectional side view of the lower portion of wheel assembly 100, first and second rim portions 210 and 212 are coupled together so that lips 220 and 222 are disposed around the cartridge. In particular, lips 220 and 222 are in cooperation with chamber portion 300. With rim portions 210, 212 coupled together, lips 220 and 222 maintain the cartridge on rim 200. In one embodiment, an adhesive, such as an epoxy, also is used on rim portions 210 and/or 220 to help maintain the cartridge in place.

Chamber portion 300 has a center protrusion 310 through which the cross-sectional depiction of FIG. 7C is taken. Protrusions 310 depicted to the left and right of the center protrusion in FIG. 7C are not in the same plane as center protrusion 310. These protrusions 310 are visible in the cross section, however, due to the substantially hollow nature of the trough-shaped chamber portion 300 between the protrusions.

Resilient member 400 is disposed over chamber portion 300. In one embodiment, resilient member 400 is coupled to lip 316 and/or lip 318 of chamber portion 300. Again, resilient member 400 and chamber portion 300 may be coupled together by way of lamination, chemical bond, stitching, and the like. Alternatively, resilient member 400 is placed over chamber portion 300 and maintained in place by the structures of chamber portion 300, resilient member 400 and actuator 500 without the need for a coupling mechanism or adhesive.

Ridges 410 can be seen on both inner surface 412 and outer surface 414 of resilient member 400. Ridges 410 on inner surface 412 of resilient member 400 are positioned to engage upper edges 322 of protrusion 310. As shown, in one embodiment ridges 410 on inner surface 412 are shaped and positioned so that they have a larger diameter or semi-major axis compared to the diameter or semi-major axis of protrusion 310. Ridges 410 help maintain resilient member 400 in the proper relationship relative to chamber portion 300. In a particular embodiment, the combination of ridges 410 on both surfaces 412, 414 of resilient member 400 result in resilient member 400 being about twice as thick at those locations than the resilient member 400 thickness at locations devoid of ridges 410.

Ridges 410 further define a thickened portion of resilient member 400 around lips 316. These thickened portions of resilient member 400 help accommodate greater stresses due to the stretching of resilient member 400 when wheel assembly 100 is loaded with a weight. Similarly, ridges 410 on outer surface 414 of resilient member 400 are in cooperation with hole 510 of actuator 500. In one embodiment, ridges 410 on outer surface 414 have a smaller diameter or semi-major axis than holes 510 in actuator 500. In this manner, ridges 410 help maintain resilient member 400 in the proper relationship with respect to both the underlying chamber portion 300 and the overlying actuator 500.

Wheel assembly 100 includes traction layer 600, disposed over actuator 500 as shown in FIG. 7C, with holes 610 and 510 aligned as shown. In one embodiment, traction layer 600 extends about 0.25 inches to about 0.50 inches above upper surfaces 514 of raised protrusions 512. In a particular embodiment, the cartridge is between about 1.5 inches and about 3.0 inches thick, measured from the rim-contacting surface of chamber portion 300 to outer surface 614 of traction layer 600.

Figure 8A:
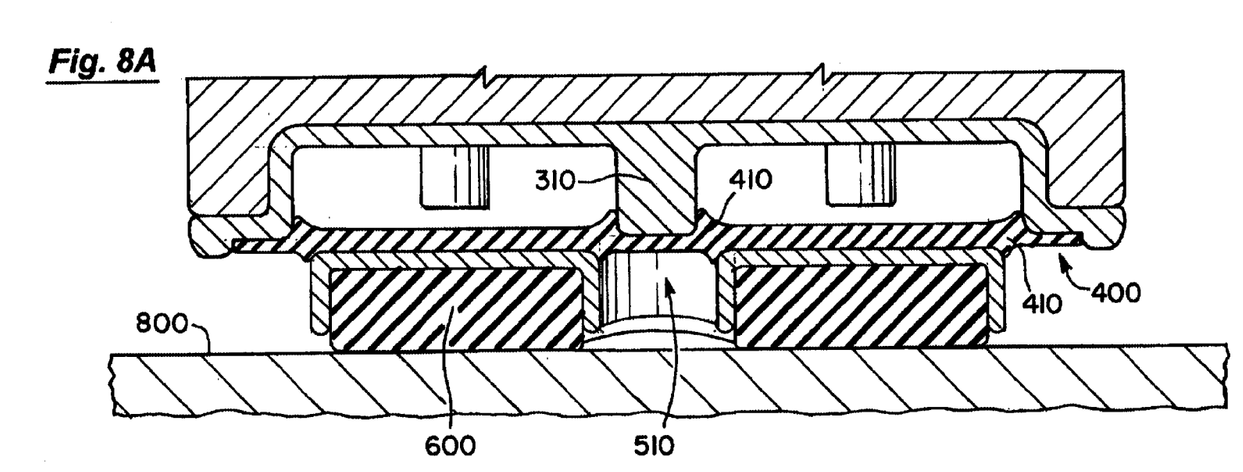
FIGS. 8A, 8B and 8C are close-up front cross-sectional views of a portion of a wheel assembly according to the present invention in unloaded (FIG. 8A) and loaded (FIGS. 8B–8C) states, respectively.
Figure 8B:
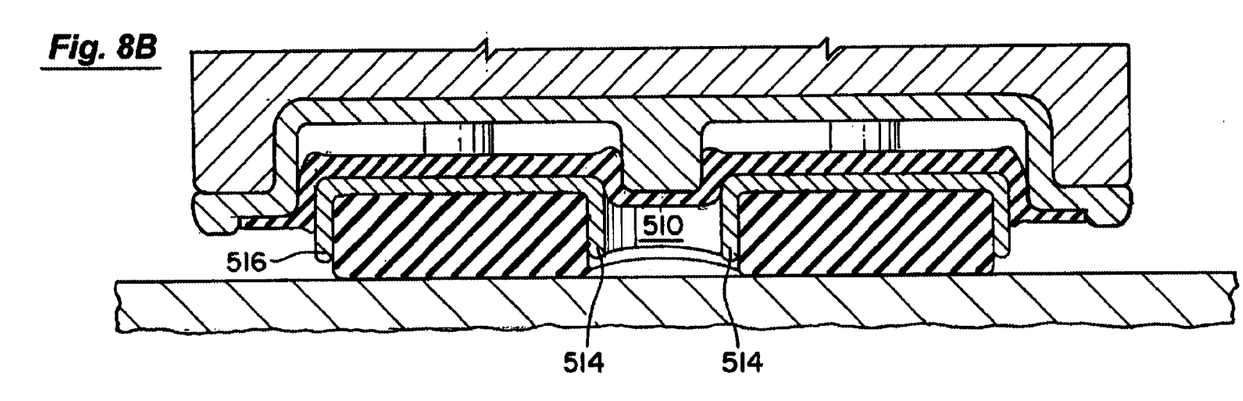

Turning now to FIGS. 8A and 8B, the operation of one embodiment of wheel assembly 100 according to the present invention will be described. FIG. 8A depicts wheel assembly 100 in an unloaded or unweighted position. In this configuration, resilient member 400 is in a relaxed state.

Once wheel assembly 100 is loaded with a weight, such as a vehicle, a person, or the like, wheel assembly 100 undertakes the position shown in FIG. 8B. The weighting of wheel assembly 100 compresses traction layer 600 and actuator 500 towards chamber portion 300. This compression results in a stretching of resilient layer 400. As shown in FIG. 8B, central protrusion 310 is pressed into resilient member 400 causing resilient member 400 to stretch at least partially into actuator hole 510. Further, resilient member 400 may stretch so that protrusion 310 is at least partially disposed in hole 610 of traction layer 600. Due to the weight load, resilient member 400 also is stretched so that it is disposed at least partially in chamber portion 300. This occurs in at least some chamber portion 300 locations which are devoid of protrusions 310. Once wheel assembly 100 is loaded with the weight, the wheel assembly 100 settles into a static state as shown in FIG. 8B provided wheel assembly 100 is not rolling or moving.

Preferably, the materials and resilience of traction layer 600, actuator 500, resilient member 400, and chamber portion 300 are provided so that the loading of wheel assembly 100 with a weight will not cause resilient member 400 to be driven to the bottom 314 of chamber 300. This may be accomplished in a number of ways, for example, by having wheel assemblies 100 with a desired size compared to the size of the weight load or vehicle. Also, resilient member 400 thickness may be controlled so that a greater weight load can be held.

In a particular embodiment, chamber portion 300 is hermetically sealed by resilient member 400. This may be accomplished, for example, by hermetically sealing resilient member 400 to lip 316. In this manner, compression of resilient member 400 into chamber portion 300 causes an increase in gas or air pressure within the sealed chamber portion 300. Thus, when the weight load is increased, the gas or air pressure in chamber portion 300 increases to help counteract the weight load. A greater transfer of force also occurs when resilient member 400 returns to the relaxed state. This may occur, for example, when wheel assembly 100 is unloaded, such as by rolling wheel assembly 100 forwards or backwards. Further, the hoop strength of actuator 500 helps keep protrusions 310 from being driven too far into resilient member 400.

In still another embodiment, a vacuum is formed in chamber portion 300, with the vacuum maintained by hermetically sealing resilient member 400 to lip portion 316 and, if needed, to protrusions 310. Such an embodiment may be formed, for example, by sealing resilient member 400 to chamber portion 300 when the two components are in a sub-atmospheric facility or chamber. Gas or air pressure within chamber portion 300 is one (1) atmosphere (ATM), less than 1.0 ATM, and substantially a vacuum in alternative embodiments. In this embodiment, an upper portion 720 (FIG. 7B) of wheel assembly 100, opposite a portion 710 of wheel assembly 100 that is in contact with the ground, helps prevent resilient member 400 from contacting bottom surface 314. For example, as the weight load increases, actuator 500 at the road contacting portion 710 of assembly 100 is driven towards chamber portion 300. Due in part to the hoop strength of actuator 500, the actuator pulls away from resilient member 400 near upper portion 720 of wheel assembly 100. The increased hoop strength of actuator 500 helps maintain actuator 500 in its cylindrical shape, effectively pulling the lower portion of actuator 500 upwards and forwards as well.

Figure 8C:
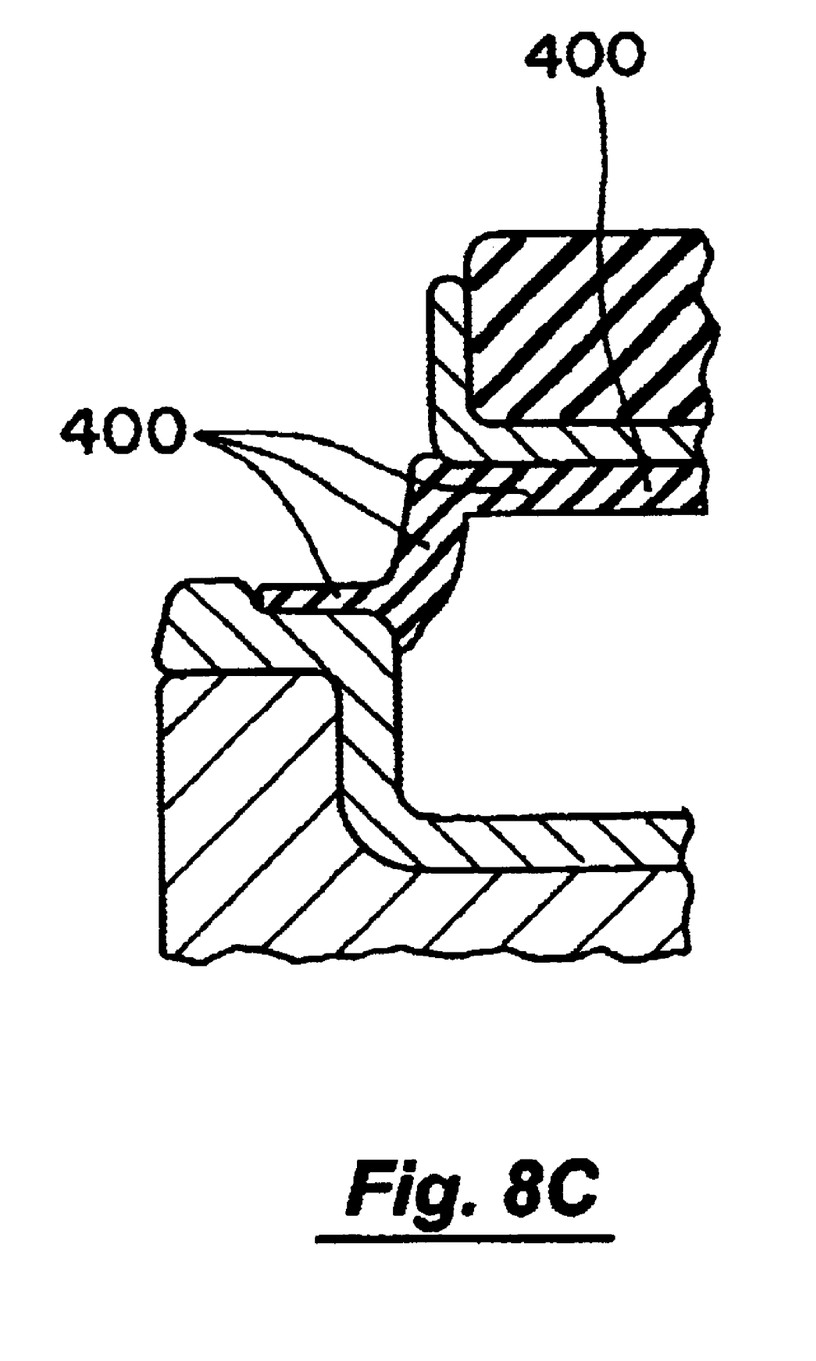

While the stationary loading and unloading of wheel assembly 100 has been described generally in conjunction with FIGS. 8A and 8B, some embodiments will be extremely useful for efficient vehicle travel. For example, the loaded wheel assembly 100 has a compressed lower assembly portion 710 contacting the road surface or ground. Due in part to the increased hoop strength of actuator 500 compared to the hoop strength of resilient member 400, actuator 500 attempts to remain in a generally circular configuration (when viewed from the side as in FIG. 7B) by pulling away from resilient member 400 at locations other than lower portion 710. In some embodiments, this force is exerted at upper portion 720 of wheel assembly 100 (FIG. 8C, and also along a periphery 730 of assembly 100. In such a manner, wheel assembly 100, when loaded, has a similar energy state as a wheel assembly resting on a small mound, ready to roll either forwards or backwards when given a slight forwards or backwards impulse, respectively, due in part to the loaded resilient member.

In one embodiment, as a vehicle having wheel assemblies 100 begins to move forward as shown by an arrow 740 in FIG. 7B, resilient member 400 is stretched or compressed into chamber portion 300, and stretched into actuator hole 510 by protrusion 310. This compression and/or stretching occurs largely at the ground-contacting portion 710 of assembly 100. The compression and/or stretching stores kinetic energy as an elastic strain in resilient member 400. As wheel assembly 100 continues to rotate so that the stretched or compressed portion rotates away from the ground or road surface, that portion of resilient member 400 returns to a more relaxed state and releases the stored energy. Further, as discussed above, the forward peripheral portion 730 of assembly 100 contains stored kinetic energy in that portion of resilient member 400, due in part to the hoop strength of actuator 500 resulting in actuator 500 attempting to stay in a generally circular shape. Once forward motion 740 has begun, the forward periphery portion 730 acts to pull wheel assembly 100 rotational forwards, similar to rolling down a hill. As a result, in some embodiments a large portion of wheel assembly 100 operates to assist vehicle travel, and not just the road contacting portion 710.

Further, the use of a substantially incompressible traction layer 600, as well as generally rigid materials for rim 200 and chamber portion 300, results in a more linear transfer of energy in the direction of travel. As will be appreciated by those skilled in the art, automobile travel with conventional tires, particularly upon turning, compresses the tire side wall. The side wall is constantly loaded and unloaded, with fibers in the sidewall straining to maintain the tire shape under extreme loads, such as during turning and braking. Further, the energy absorbed into the side wall is not transferred in a linear fashion to assist with the travel of the vehicle. A certain amount of this energy is lost in the creation of heat within the sidewall fibers.

In contrast, the present invention, in one embodiment, involves the stretching or compression and the subsequent relaxing or decompression of resilient member 400 generally aligned in the direction of travel. Hence, wheel assemblies 100 of the present invention provide for more efficient use of stored and returned energy compared to standard wheels. Further, resilient member 400 is composed of materials specifically designed for a highly efficient return of compressed energy. The loading and subsequent unloading of resilient member 400 by wheel assembly 100 rotation results in a large percentage of energy return from the stretched resilient member 400.

The invention has now been described in detail for purposes of clarity and understanding. However, it will be appreciated that certain changes and modifications may be practiced within the scope of the appended claims.

What is claimed is:

1. A vehicle wheel assembly, the wheel assembly comprising:
   a first rim portion having a first circumferential edge;
   a second rim portion having a second circumferential edge, wherein the first and second rim portions are coupled together to define a trough portion between the first and second circumferential edges; and
   a cartridge disposed in the trough portion between the first and second circumferential edges, the cartridge comprising:
      a chamber portion having a plurality of spaced protrusions;
      a resilient member disposed over the plurality of spaced protrusions;
      an actuator disposed over the resilient layer; and
      a traction layer disposed over the actuator;
      wherein the actuator is adapted to compress the resilient layer at least partially into the chamber portion when the wheel assembly is loaded with a weight.

2. The wheel assembly as in claim 1 wherein the plurality of spaced protrusions are positioned to define at least two circumferential rings of protrusions.

3. The wheel assembly as in claim 1 wherein the chamber portion comprises a generally trough-shaped chamber portion having first and second lips, the resilient member in cooperation with the first and second lips.

4. The wheel assembly as in claim 1 wherein the resilient member comprises an upper surface and a lower surface, the lower surface comprising a plurality of raised ridges, the raised ridges positioned to be in cooperation with the plurality of spaced protrusions.

5. The wheel assembly as in claim 4 wherein the resilient member upper surface comprises a second plurality of raised ridges in cooperation with the actuator.

6. The wheel assembly as in claim 4 wherein the resilient member has a thickness, and wherein the thickness is about twice as thick at a location having one of the raised ridges compared to the resilient member thickness at a location devoid of the plurality of raised ridges.

7. The wheel assembly as in claim 1 wherein the resilient member is in cooperation with an outer rim of the chamber portion to define a generally hermetically-sealed chamber.

8. The wheel assembly as in claim 7 wherein the hermetically-sealed chamber has an internal pressure that is less than one (1) atmosphere (ATM).

9. The wheel assembly as in claim 7 wherein the hermetically-sealed chamber comprises a vacuum chamber.

10. The wheel assembly as in claim 1 wherein the actuator comprises a cylindrical-shaped band, the band having a plurality of spaced apart holes formed therethrough.

11. The wheel assembly as in claim 10 wherein the spaced apart holes are positioned to define at least two circumferential rings of spaced apart holes.

12. The wheel assembly as in claim 10 wherein the spaced apart holes are positioned to be in cooperation with the plurality of spaced apart protrusions in the chamber portion.

13. The wheel assembly as in claim 12 wherein the spaced apart protrusions in the chamber portion are adapted to extend at least part way into the spaced apart holes of the actuator when the wheel assembly is loaded with the weight.

14. The wheel assembly as in claim 1 wherein the traction layer comprises a cylindrical-shaped traction band, the traction band having a plurality of spaced apart holes formed therethrough.

15. The wheel assembly as in claim 14 wherein the spaced apart holes are positioned to define at least two circumferential rings of spaced apart holes in the traction band.

16. The wheel assembly as in claim 14 wherein the spaced apart holes are positioned to be in cooperation with the plurality of spaced apart protrusions in the chamber portion.

17. The wheel assembly as in claim 16 wherein the spaced apart protrusions in the chamber portion are adapted to extend at least part way into the spaced apart holes of the traction band when the wheel assembly is loaded with the weight.

18. The wheel assembly as in claim 1 wherein the actuator comprises a cylindrical-shaped actuator band and the traction layer comprises a cylindrical-shape traction band, the actuator band and traction band each having a plurality of spaced apart holes formed therethrough, the actuator band spaced apart holes in cooperation with the traction band spaced apart holes.

19. The wheel assembly as in claim 18 wherein the plurality of spaced apart holes in the actuator band are further in cooperation with the spaced apart protrusions of the chamber portion.

20. The wheel assembly as in claim 19 wherein the resilient member is adapted to stretch at least part way into the spaced apart actuator band holes when the wheel assembly is loaded with the weight.

21. The wheel assembly as in claim 1 wherein the weight comprises a motorized vehicle.

22. The wheel assembly as in claim 1 wherein the weight comprises a non-motorized vehicle.

23. The wheel assembly as in claim 1 wherein the traction layer comprises a substantially incompressible rubber.

24. The wheel assembly as in claim 1 wherein the chamber portion comprises a nylon.

25. The wheel assembly as in claim 1 wherein the resilient member comprises a rubber.

26. The wheel assembly as in claim 1 wherein the actuator comprises a nylon.

27. The wheel assembly as in claim 1 wherein the traction layer comprises an outer surface, the outer surface having a groove pattern defined therein.

28. A vehicle wheel assembly, the wheel assembly comprising:
   a cartridge adapted to be coupled to a wheel rim between first and second outer rim edges, the cartridge comprising:
      a chamber portion having a plurality of spaced protrusions;
      a resilient member disposed over the plurality of spaced protrusions;
      an actuator disposed over the resilient layer; and
      a traction layer disposed over the actuator;
      wherein the actuator is adapted to compress the resilient layer at least partially into the chamber portion when the wheel assembly is loaded with a weight.

29. The wheel assembly as in claim 28 wherein the cartridge comprises a generally cylindrical cartridge disposed between the two rim edges.

30. A wheel assembly comprising:
   a traction layer disposed over an actuator, the traction layer and actuator each having a plurality of holes disposed therethrough, the traction layer holes in alignment with the actuator holes;
   a chamber portion adapted to be coupled to a wheel rim, the chamber portion having inner and outer edges defining a recessed bottom therebetween, the recessed bottom having a plurality of spaced protrusions extending therefrom; and
   a resilient member disposed between the chamber portion and the actuator;
   wherein the resilient member is adapted to stretch into the chamber portion between the spaced protrusions, and is adapted to stretch at least part way into the actuator holes over the spaced protrusions.

31. The wheel assembly as in claim 30 wherein the spaced protruisions are in substantial alignment with the actuator.

32. The wheel assembly as in claim 30 wherein the resilient member comprises a compressible rubber.

33. The wheel assembly as in claim 30 wherein the traction layer, actuator, chamber portion and resilient member are each generally cylindrical in shape, and wherein the actuator and chamber portion have a greater hoop strength than the traction layer and the resilient member.

* * * * *

UNITED STATES PATENT AND TRADEMARK OFFICE
CERTIFICATE OF CORRECTION

PATENT NO. : 6,701,985 B2
DATED : March 9, 2004
INVENTOR(S) : Brian A. Russell

It is certified that error appears in the above-identified patent and that said Letters Patent is hereby corrected as shown below:

<u>Title page,</u>
Item [56], References Cited, U.S. PATENT DOCUMENTS, the following references are to be added:

| | | |
|---|---|---|
| -- 863,827 | 08-20-1907 | J. Alloatti |
| 1,134,291 | 04-06-1915 | W. J. Spencer |
| 1,213,834 | 01-30-1917 | R. Bunzlau et al. |
| 1,312,582 | 08-12-1919 | F. Schneible |
| 1,319,726 | 10-28-1919 | H. H. Schramm |
| 1,403,115 | 01-10-1922 | M. Golein |
| 1,447,365 | 03-06-1923 | G. Walther |
| 5,573,510 | 03-04-1986 | Jakob Ippen et al. -- |

Signed and Sealed this

Twenty-ninth Day of June, 2004

JON W. DUDAS
*Acting Director of the United States Patent and Trademark Office*